(12) United States Patent
Kim

(10) Patent No.: US 7,100,659 B2
(45) Date of Patent: Sep. 5, 2006

(54) DEVICE FOR HOLDING A FILM ROLL IN A LAMINATOR

(75) Inventor: Yang-Pioung Kim, Seoul (KR)

(73) Assignee: GMP Co., Ltd., Paju (KR)

( * ) Notice: Subject to any disclaimer, the term of this patent is extended or adjusted under 35 U.S.C. 154(b) by 0 days.

(21) Appl. No.: 11/084,851

(22) Filed: Mar. 21, 2005

(65) Prior Publication Data
US 2006/0108072 A1 May 25, 2006

(30) Foreign Application Priority Data
Nov. 25, 2004 (KR) ............... 20-2004-0033330

(51) Int. Cl.
*B32B 37/00* (2006.01)

(52) U.S. Cl. ................ 156/555; 156/582

(58) Field of Classification Search ........... 156/555, 156/580, 582, 583.1; 100/327, 160, 176
See application file for complete search history.

(56) References Cited

U.S. PATENT DOCUMENTS

| | | | | |
|---|---|---|---|---|
| 5,071,504 A | * | 12/1991 | Singer | 100/314 |
| 5,584,962 A | * | 12/1996 | Bradshaw et al. | 156/495 |
| 5,873,965 A | * | 2/1999 | Greller | 156/64 |
| 6,675,855 B1 | * | 1/2004 | Lemens | 156/555 |

* cited by examiner

*Primary Examiner*—James Sells
(74) *Attorney, Agent, or Firm*—Egbert Law Offices

(57) ABSTRACT

The device for holding a film roll in a laminator. The film roll holding device of the present invention helps a user correctly install the film roll in the laminator without confusing a film roll installation orientation. Furthermore, the film roll holding device can appropriately tension the film during a film-coating process despite having a simple structure.

2 Claims, 4 Drawing Sheets

DEVICE FOR HOLDING A FILM ROLL IN A LAMINATOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to devices for holding film rolls in laminators and, more particularly, to a device for holding a film roll in a laminator which helps a user correctly install the film roll in the laminator without confusing a film roll installation orientation, and can appropriately tension the film during a film-coating process despite of having a simple structure.

BACKGROUND OF THE INVENTION

As well known to those skilled in the art, in laminators, films wound around upper and lower film rollers pass between a pair of heating rollers and a pair of feed rollers. Thereafter, an object material passes between both the heating rollers and the feed rollers after being guided by a guide plate. Thus, the films are attached to upper and lower surfaces of the object material.

The laminators are classified into a laminator using a film roll formed by rolling a film around a paper tube, and a laminator using sheet films which are marketed after being cut into various sizes.

The present invention relates to a device to solve problems occurring in conventional laminators using the film rolls.

Such a film-roll type laminator has two film rolls to supply upper and lower films to heating rollers. The upper and lower films are respectively coated on upper and lower surfaces of an object material.

Each of the film rolls must be installed in the laminator such that an adhesive surface of the film faces towards a surface of the object material. Therefore, when the film roll is installed in the laminator, the user must always confirm a correct film roll installation orientation. However, it is difficult to distinguish the film roll installation orientation. Thus, in the film-roll type laminator, a problem of installing the film roll to the laminator in a backwards orientation frequently occurs.

Furthermore, both ends of the upper and lower film rolls must be aligned with both sides of the object material. However, it is very difficult for general users. If the upper and lower film rolls are not precisely aligned with the object material, both sides of the object material may not be coated with the films.

As well, the film extracted from the film roll must be tensioned to a predetermined tension to prevent the film from being undesirably folded. To achieve this purpose, conventional laminators have a separate unit to tension a film. Therefore, the conventional laminators are problematic in that the costs of the laminator are excessively increased.

BRIEF SUMMARY OF THE INVENTION

Accordingly, the present invention has been made keeping in mind the above problems occurring in the prior art, and an object of the present invention is to provide a device for holding a film roll in a laminator which helps a user correctly install the film roll in the laminator without confusing a film roll installation orientation, and by which, when upper and lower film rolls are installed in the laminator, both ends of the upper and lower film rolls are precisely aligned with both sides of an object material, thus evenly coating the films on all of both surfaces of the object material, and which can appropriately tension the films during a film-coating process despite having a simple structure.

In order to accomplish the above object, the present invention provides a device for holding a film roll in a laminator, including: a movable support unit provided at a predetermined position on an inner surface of a sidewall of the laminator. The movable support unit has a cylindrical body, with a plurality of locking holes provided on an outer surface of the cylindrical body, and an external thread provided on a first end of the cylindrical body while being tightened into a support hole formed on the sidewall of the laminator, and a ring seat groove provided on an outer surface of a second end of the cylindrical body to receive therein a retainer ring; a movable body fitted over the outer surface of the cylindrical body, with a receiving hole axially formed in the movable body to allow the cylindrical body to pass through the movable body, and a stopper and a screw hole provided at predetermined positions on the outer surface of the movable body; and a hand-operated adjusting screw having an external thread and tightened into the screw hole of the movable body, with a locking protrusion provided on a first end of the hand-operated adjusting screw, and a knob provided on a second end of the hand-operated adjusting screw. The film roll holding device further includes a fixed support unit provided at a predetermined position on an inner surface of an opposite sidewall of the laminator. The fixed support unit has a support plate, with a bolt hole provided at a predetermined position on the support plate; an arc-shaped elastic seat coupled at a first end thereof to an inner surface of the support plate to support therein an end of the paper tube of the film roll, with a through hole provided on a second end of the arc-shaped elastic seat; and an adjusting bolt coupled at an end thereof to the second end of the arc-shaped elastic seat while being tightened into the bolt hole of the support plate, with a pair of washers fitted over the end of the adjusting bolt around both sides of the through hole of the arc-shaped elastic seat so that the arc-shaped elastic seat is fastened to the end of the adjusting bolt. The film roll holding device further includes: an insert support unit, having an insert part provided on a first end of the insert support unit to be inserted into a hole in a paper tube of the film roll, a stopper provided at a predetermined position on an outer surface of the insert support unit, and a support part provided on a second end of the insert support unit, the support part being seated in the arc-shaped elastic seat.

BRIEF DESCRIPTION OF THE SEVERAL VIEWS OF THE DRAWINGS

The above and other objects, features and advantages of the present invention will be more clearly understood from the following detailed description taken in conjunction with the accompanying drawings.

DETAILED DESCRIPTION OF THE INVENTION

Hereinafter, preferred embodiments of the present invention will be described in detail with reference to the accompanying drawings.

Figure 1:
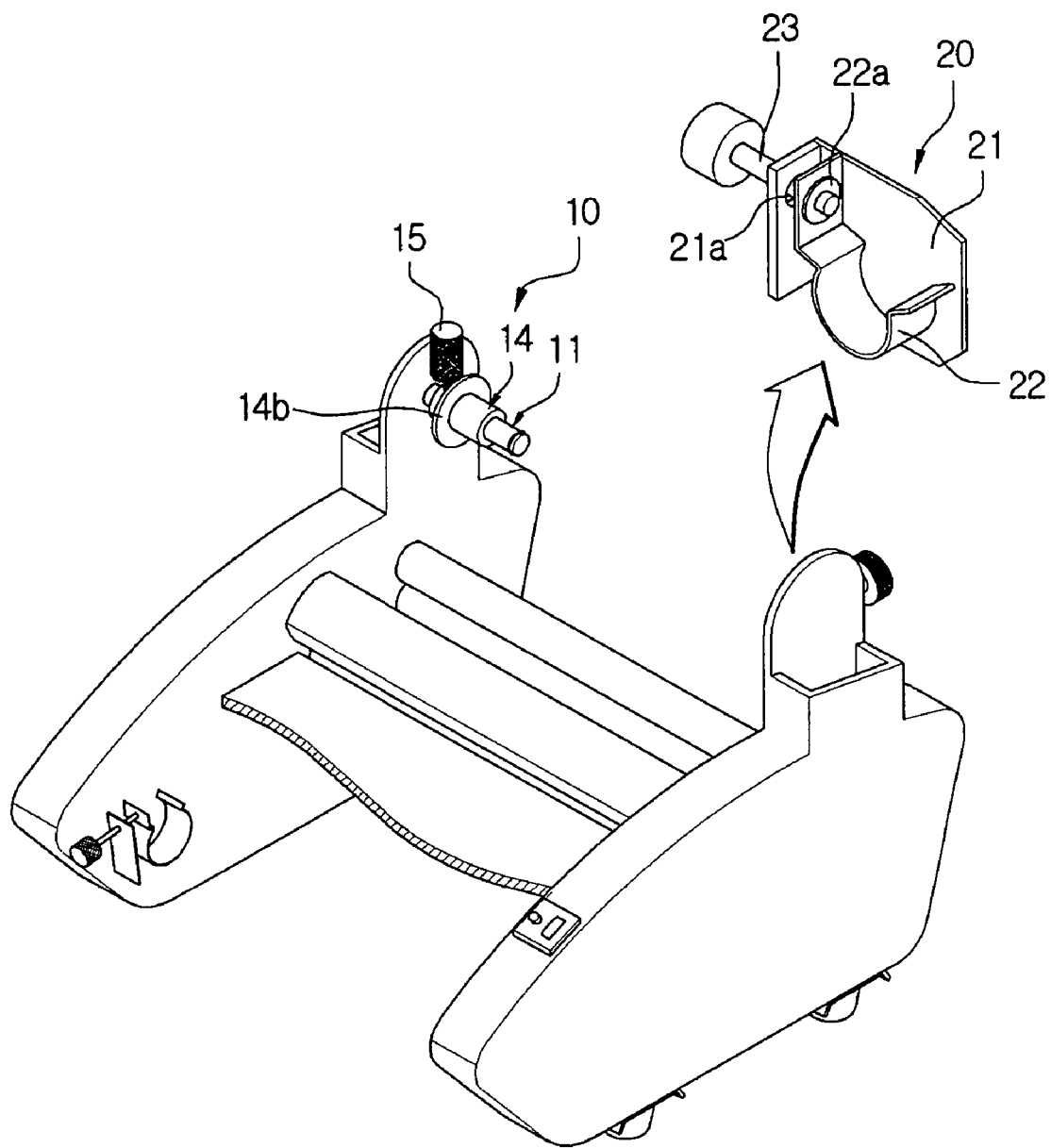
FIG. 1 is a perspective view of a laminator having a film roll holding device according to a first embodiment of the present invention.
Figure 2:
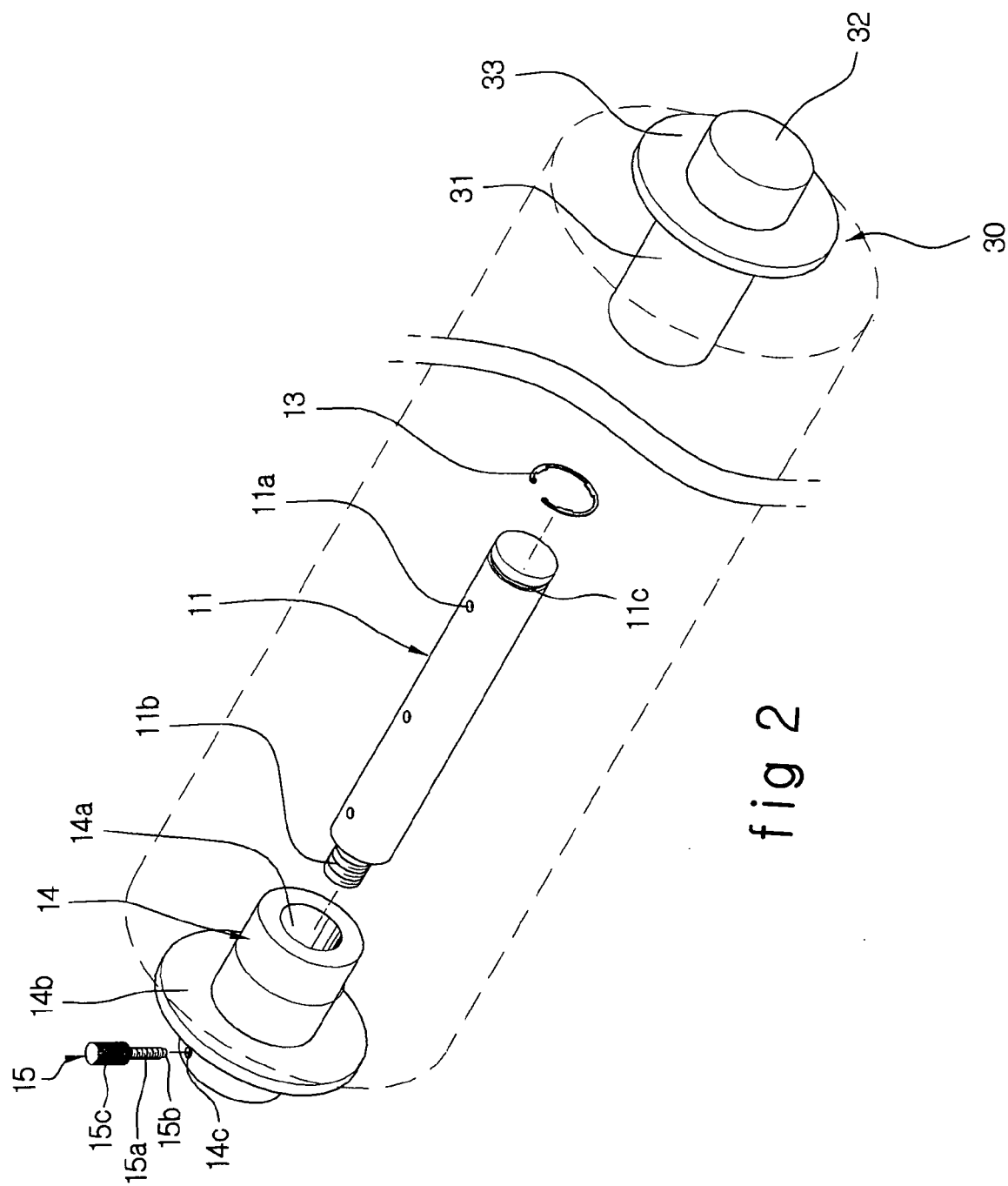
FIG. 2 is an exploded perspective view to show a part of the film roll holding device of FIG. 1.
Figure 3:
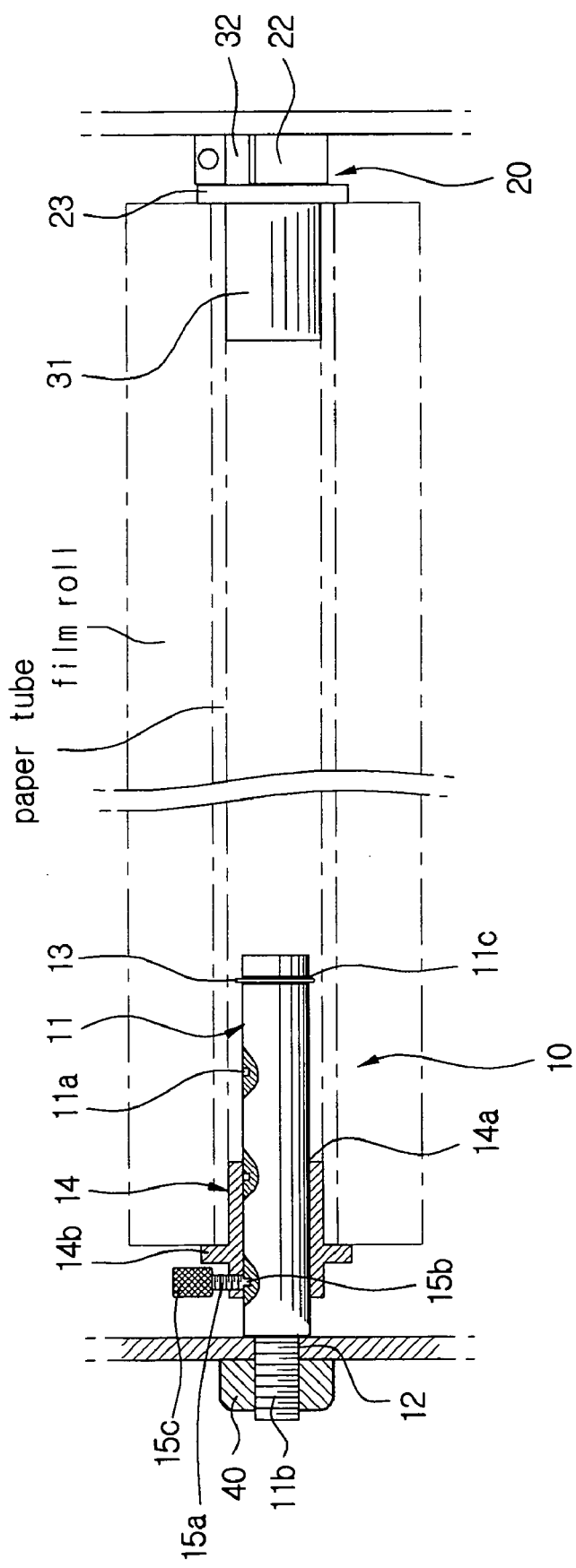
FIG. 3 is a sectional view to show the film roll holding device mounted to opposite sidewalls of the laminator of FIG. 1.

FIG. 1 is a perspective view of a laminator having a film roll holding device according to a first embodiment of the present invention. FIG. 2 is an exploded perspective view to show a part of the film roll holding device of FIG. 1. FIG. 3 is a sectional view to show the film roll holding device mounted to opposite sidewalls of the laminator of FIG. 1.

As shown in FIGS. 1 through 3, the film roll holding device according to the first embodiment is mounted to the opposite sidewalls of the laminator. The film roll holding device includes a movable support unit 10 which is coupled to a first end of a paper tube of a film roll. The film roll holding device further includes a fixed support unit 20 which is coupled to a second end of the paper tube.

The movable support unit 10 is provided at a predetermined position on an inner surface of a first sidewall of the laminator. The movable support unit 10 has a cylindrical body 11. A plurality of locking holes 11a is provided on an outer surface of the cylindrical body 11. An external thread 11b is provided on a first end of the cylindrical body 11 and is tightened into a support hole 12 formed on the first sidewall of the laminator. A ring seat groove 11c is provided on an outer surface of a second end of the cylindrical body 11 to receive therein a retainer ring 13. The movable support unit 10 further has a movable body 14 which is fitted over the outer surface of the cylindrical body 11. A receiving hole 14a is axially formed in the movable body 14 to allow the cylindrical body 11 to pass through the movable body 14. A stopper 14b and a screw hole 14c are provided at predetermined positions on the outer surface of the movable body 14. The movable support unit 10 further has a hand-operated adjusting screw 15 which has an external thread 15a and is tightened into the screw hole 14c of the movable body 14, with a locking protrusion 15b provided on a first end of the hand-operated adjusting screw 15, and a knob 15c provided on a second end of the hand-operated adjusting screw 15.

The fixed support unit 20 is provided at a predetermined position on an inner surface of a second sidewall of the laminator opposite to the first sidewall. The fixed support unit 20 has a support plate 21, with a bolt hole 21a provided at a predetermined position on the support plate 21. The fixed support unit 20 further has an arc-shaped elastic seat 22 which is integrally coupled at a first end thereof to an inner surface of the support plate 21. A through hole (not shown) is provided on a second end of the arc-shaped elastic seat 22. The fixed support unit 20 further has an adjusting bolt 23 which is coupled at an end thereof to the second end of the arc-shaped elastic seat 22 while being tightened into the bolt hole 21a of the support plate 21. A pair of washers 22a is fitted over the end of the adjusting bolt 23 around both sides of the through hole (not shown) of the arc-shaped elastic seat 22 so that the arc-shaped elastic seat 22 is fastened to the end of the adjusting bolt 23.

As shown in FIG. 2, the film roll holding device of the present invention further includes an insert support unit 30. An insert part 31 is provided on a first end of the insert support unit 30 and is inserted into a hole of the second end of the paper tube of the film roll. A stopper 33 is provided at a predetermined position on an outer surface of the insert support unit 30. A support part 32 is provided on a second end of the insert support unit 30 to be seated in the arc-shaped elastic seat.

The above-mentioned construction defines the single film roll holding device. The operation of the film roll holding device of the present invention will be explained herein below in detail with reference to FIG. 3.

In the laminator, upper and lower film rolls are installed in upper and lower portions of the laminator, respectively. To install the upper film roll, the movable support unit 10 is mounted to an upper portion of the inner surface of the first sidewall of the laminator.

To mount the movable support unit 10 to the first sidewall, the retainer ring 13 is fitted over the ring seat groove 11c which is provided on the second end of the cylindrical body 11. The cylindrical body 11 is inserted from a first end thereof into the receiving hole 14a which is axially formed in the movable body 14 having the stopper 14b on the outer surface thereof. In the above state, the external thread 11b, formed on the first end of the cylindrical body 11, is tightened into the support hole 12 formed on the first sidewall. Thereafter, a locking nut 40 engages with a part of the first end of the cylindrical body 11 exposed outside the first sidewall, thus fastening the movable support unit 10 to the first sidewall of the laminator.

The fixed support unit 20 having the arc-shaped elastic seat 22 is mounted to an upper portion of the inner surface of the second sidewall of the laminator.

The adjusting bolt 23, passing through the bolt hole 21a of the support plate 21, is rotatably coupled at the end thereof to the second end of the arc-shaped elastic seat 22. In a state in which the support part 32 of the insert support unit 30 inserted into the upper film roll is seated in the arc-shaped elastic seat 22, if a user tightens the adjusting bolt 23 inwards, the second end of the arc-shaped elastic seat 22 moves inwards. Then, the diameter of the arc-shaped elastic seat 22 is reduced, so that the arc-shaped elastic seat 22 tightly holds the support part 32 of the insert support unit 30. By this, during a film coating process, the upper film roll is forcibly rotated, thus tensing the film supplied from the film roll.

The user places the movable body 14 of the movable support unit 10, mounted to the first sidewall, at a desired position around the cylindrical body 11. Thereafter, the user tightens the hand-operated adjusting screw 15, such that the locking protrusion 15b provided on the first end of the hand-operated adjusting screw 15 is inserted into one of the plurality of locking holes 11a of the cylindrical body 11. Thus, the movable body 14 is fastened to the cylindrical body 11 without being undesirably moved. In the above state, the first end of the paper tube of the upper film roll is fitted over an outer surface of the movable body 14. The support part 32 of the insert support unit 30 inserted into the second end of the paper tube is seated in the arc-shaped elastic seat 22. As such, the upper film roll is installed in the laminator. In this state, the user tightens the adjusting bolt 23 of the fixed support unit 20 inwards, so as to move the second end of the arc-shaped elastic seat 22 inwards. Then, the diameter of the arc-shaped elastic seat 22 is reduced, so that an inner surface of the arc-shaped elastic seat 22 is in close contact with the support part 32 of the insert support unit 30. Then, during a film coating process, the support part 32 is forcibly rotated by friction between the support part 32 and the arc-shaped seat 22, thus tensing the film supplied from the film roll.

To install the lower film roll, a movable support unit and a fixed support unit having the same structures as those of the movable support unit 10 and the fixed support unit 20 are provided. At this time, the lower movable support unit and the lower fixed support unit are mounted to lower portions of the opposite sidewalls of the laminator in a reverse direction with respective to the movable support unit 10 and the fixed support unit 20 which are mounted to the upper portions of the opposite sidewalls. This solves a problem in which the user mistakenly installs the upper and lower film rolls in backwards orientation.

As such, in the present invention, the lower movable support unit and the lower fixed support unit of the lower portion of the laminator are provided to be reversed with respective to those of the upper portion of the laminator, as shown in FIG. 1. Therefore, the user can correctly install the upper and lower film rolls in the laminator without confusing the film roll installation orientations.

Figure 4:
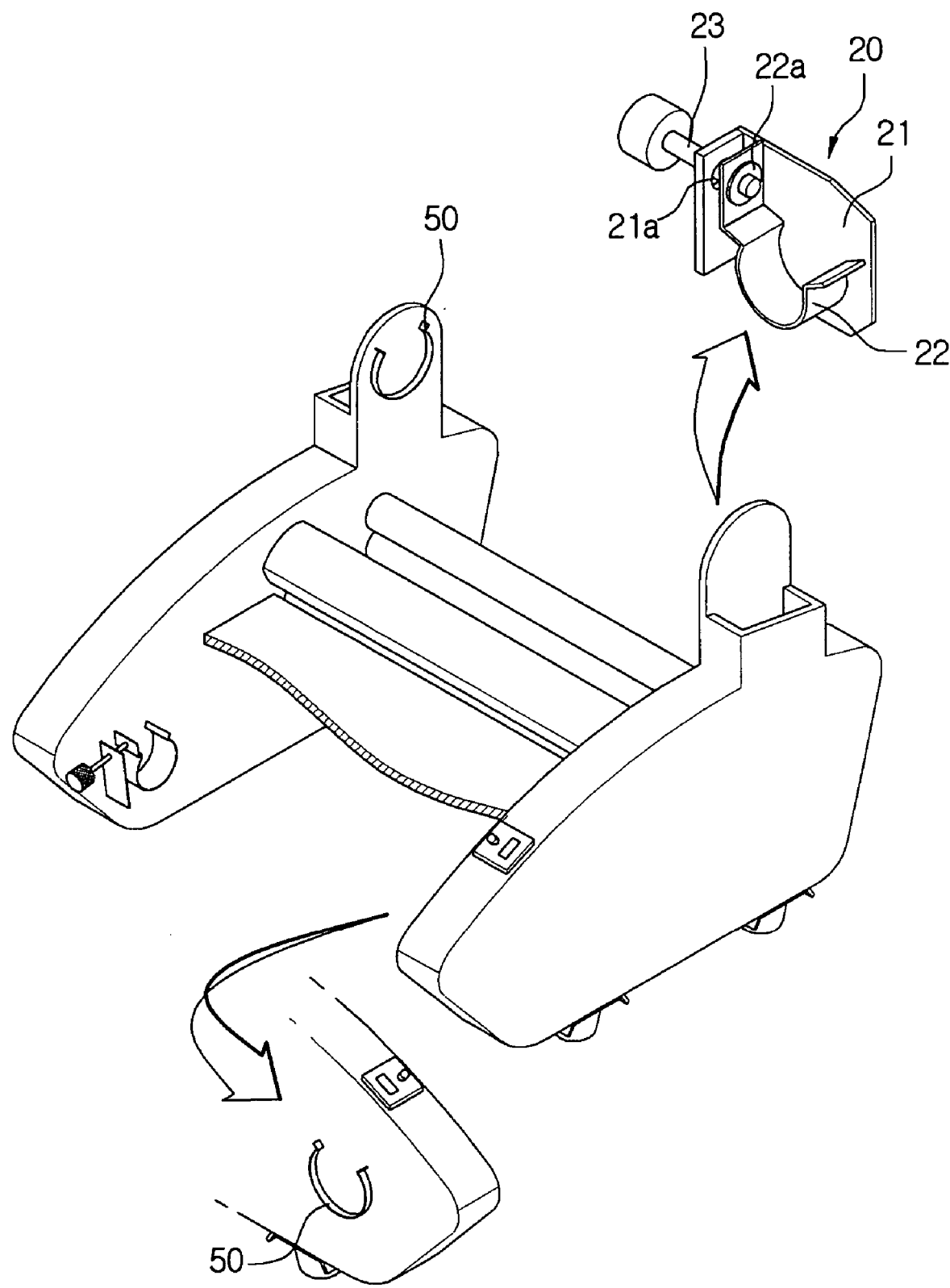
FIG. 4 is a perspective view of a laminator having a film roll holding device according to a second embodiment of the present invention.

FIG. 4 is a perspective view of a laminator having a film roll holding device according to a second embodiment of the present invention.

As shown in FIG. 4, the film roll holding device according to the second embodiment includes an arc-shaped support 50 which is provided at an upper portion on an inner surface of a first sidewall of the laminator. A fixed support unit 20 is provided on an inner surface of the second sidewall opposite to the arc-shaped support 50. The fixed support unit 20 includes an arc-shaped elastic seat 22 having A diameter different from that of the arc-shaped support 50. An insert support unit 30, which is inserted into an end of an upper film roll, is seated. In the arc-shaped elastic seat 22. Another arc-shaped support and another fixed support unit 20 are mounted to lower portions of the opposite sidewalls in the reverse direction from those of the film roll holding device mounted to the upper portion of the laminator, in the same manner as that described for the first embodiment. This helps the user correctly installs upper and lower film rolls in the laminator without confusing the film roll installation orientations.

As described above, the present invention provides a device for holding a film roll in a laminator in which diameters of both ends of the film roll are different from each other, so that the film roll is not installed in the laminator in a backwards orientation, thereby a user can correctly install the film roll in the laminator without confusing a film roll installation orientation. Furthermore, the film roll holding device of the present invention can appropriately tension the film supplied from the film roll during a film-coating process despite having a simple structure, thus reducing the manufacturing costs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. An apparatus comprising:

a laminator having a sidewall with an inner surface, said side wall having a support hole therein, said laminator having an opposite sidewall with an inner surface;

a film roll having a paper tube with a hole therein;

a movable support unit provided at a predetermined position on said inner surface of said sidewall of said laminator, said movable support unit comprising:

a cylindrical body having a plurality of locking holes provided on an outer surface thereof, said cylindrical body having an external thread formed on a first end thereof, said external thread tightened into said support hole formed on said sidewall of said laminator, said cylindrical body having a ring seat groove formed on an outer surface of a second end thereof so as to receive therein a retainer ring;

a movable body fitted over said outer surface of said cylindrical body, said movable body having a receiving hole axially formed therein so as to allow said cylindrical body to pass therethrough, said movable body having a stopper and a screw hole provided at predetermined positions on an outer surface thereof; and a hand-operated adjusting screw having an external thread, said adjusting screw tightened into said screw hole of said movable body, said hand-operated adjusting screw having a locking protrusion provided on a first end thereof, said hand-operated adjusting screw having a knob provided on a second end;

a fixed support unit provided at a predetermined position on said inner surface of said opposite sidewall of said laminator, said fixed support unit comprising:

a support plate with a bolt hole provided at a predetermined position thereon;

an arc-shaped elastic seat coupled at a first end thereof to an inner surface of said support plate so as to support therein an end of said paper tube of said film roll, said elastic seat having a through hole provided on a second end thereof; and an adjusting bolt coupled at an end thereof to said second end of said arc-shaped elastic seat, said adjusting bolt being tightened into said bolt hole of said support plate, said end of the adjusting bolt having a pair of washers fitted thereover and around both sides of said through hole of said arc-shaped elastic seat so that said arc-shaped elastic seat is fastened to said end of the adjusting bolt; and an insert support unit having a first end and a second end and an outer surface, said insert support unit comprising:

an insert part provided on said first end of said insert support unit, said insert part insertable into said hole in said paper tube of said film roll;

a stopper provided at a predetermined position on said outer surface of said insert support unit; and a support part provided on said second end of said insert support unit, said support part being seated in said arc-shaped elastic seat.

2. An apparatus comprising:

a laminator having a first sidewall with an inner surface and a second sidewall with an inner surface, said first sidewall being opposite said first sidewall, said first sidewall having a support hole therein;

a film roll having a paper tube with a hole therein;

a fixed support unit provided at a predetermined position on said inner surface of said first sidewall of said laminator, said fixed support unit comprising:
- a support plate with a bolt hole provided at a predetermined position thereon;
- an arc-shaped elastic seat coupled at a first end thereof to an inner surface of said support plate to support therein an end of said paper tube of said film roll, a second end of said arc-shaped elastic seat having a through hole therein; and
- an adjusting bolt coupled at an end thereof to said second end of said arc-shaped elastic seat while being tightened into said bolt hole of said support plate, said end of said adjusting bolt having a pair of washers fitted thereover and around both sides of said through hole of said arc-shaped elastic seat such that said arc-shaped elastic seat is fastened to said end of said adjusting bolt;

an arc-shaped support provided on said inner surface of said second sidewall of said laminator opposite to said fixed support unit, said arc-shaped support having a predetermined diameter different from a diameter of said arc-shaped elastic seat of said fixed support unit;

an insert support unit having a first end and a second end and an outer surface, said insert support unit comprising:
- an insert part provided on said first end of said insert support unit, said insert part inserted into said hole of said paper tube of said film roll;
- a stopper provided at a predetermined position on said outer surface of said insert support unit; and
- a support part provided on said second end of said insert support unit, said support part being seated in said arc-shaped elastic seat.

\* \* \* \* \*